US006534743B2

(12) United States Patent
Swenson et al.

(10) Patent No.: US 6,534,743 B2
(45) Date of Patent: Mar. 18, 2003

(54) RESISTOR TRIMMING WITH SMALL UNIFORM SPOT FROM SOLID-STATE UV LASER

(75) Inventors: Edward J. Swenson, Portland, OR (US); Yunlong Sun, Beaverton, OR (US); Richard S. Harris, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 10/066,351

(22) Filed: Jan. 31, 2002

(65) Prior Publication Data

US 2002/0100749 A1 Aug. 1, 2002

Related U.S. Application Data

(60) Provisional application No. 60/301,706, filed on Jun. 28, 2001, and provisional application No. 60/266,172, filed on Feb. 1, 2001.

(51) Int. Cl.[7] .................. B23K 26/00; B23K 26/14; B23K 26/16; B23K 26/18
(52) U.S. Cl. ................... 219/121.69; 219/121.6
(58) Field of Search .................. 219/121.69, 121.6, 219/121.68, 121.83

(56) References Cited

U.S. PATENT DOCUMENTS

| 5,104,480 A | * | 4/1992 | Wojnarowski et al. ...... 156/643 |
| 5,233,327 A | | 8/1993 | Bartush et al. .............. 338/195 |
| 5,569,398 A | | 10/1996 | Sun et al. ............. 219/121.68 |
| 5,675,310 A | | 10/1997 | Wojnarowski et al. ...... 338/309 |
| 5,685,995 A | * | 11/1997 | Sun et al. ................. 219/121.6 |
| 5,751,585 A | | 5/1998 | Cutler et al. ............ 364/474.03 |
| 5,753,391 A | | 5/1998 | Stone et al. ................... 430/22 |
| 5,808,272 A | | 9/1998 | Sun et al. ............... 219/121.68 |
| 5,849,623 A | | 12/1998 | Wojnarowski et al. ....... 438/382 |
| 5,864,430 A | | 1/1999 | Dickey et al. .............. 359/559 |

FOREIGN PATENT DOCUMENTS

| JP | 62160726 | 7/1987 | |
| WO | 9940591 | 8/1999 | ......... H01C/17/242 |
| WO | 0073013 | 12/2000 | ........... B23K/26/06 |

OTHER PUBLICATIONS

Swenson, et al., "Laser Micromachining in the Microelectronics Industry: A Historical Overview," *SPIE's 45th Annual Meeting, The International Symposium on Optical Science and Technology* (Jul. 30–Aug. 4, 2000).
"2300 Chip Resistor Trimming System, Model 2300 Benefits" brochure by Electro Scientific Industries (Jul. 2000).
"4370 Laser Trimming System" brochure by Electro Scientific Industries (Jul. 2000).
Instruction Manual for SL436G Laser Trimmer (B19–001028 Issue 1) NEC Corporation, Tokyo, Japan (1997).

(List continued on next page.)

Primary Examiner—M. Alexandra Elve
(74) Attorney, Agent, or Firm—Stoel Rives LLP

(57) ABSTRACT

A uniform laser spot, such as from an imaged shaped Gaussian output (118) or a clipped Gaussian spot, that is less than 20 μm in diameter can be employed for both thin and thick film resistor trimming to substantially reduce microcracking. These spots can be generated in an ablative, nonthermal, UV laser wavelength to reduce the HAZ and/or shift in TCR.

50 Claims, 10 Drawing Sheets

OTHER PUBLICATIONS

Swenson, Edward J., "Laser Processing of Semiconductors and Hybrids," Proceedings of SPIE—The International Society for Opital Engineering, vol. 611 (1986).

Cable, Alan, "Solving the High Speed Laser Trimming Puzzle," reprinted from Hybrid Circuit Technology (Sep. 1984).

Swenson, et al., "Reducing Post Trim Drift of Thin Film Resistors By Optimizing YAG Laser Output Characteristics," reprinted from IEEE Transactions on Components, Hybrids, and Manufacturing Technology (Dec. 1978).

Swenson, Edward J., "Laser Resistance Trimming from the Measurement Point of View," reprinted from IEEE Transactions on Parts, Hybrids, and Packaging, vol. PHP–8, No. 2 (Jun. 1972).

Dunsky, Corey, et al., "High Quality Microvia Formation with Imaged UV YAG Lasers," Electro Scientific Industries (undated).

International Search Report in connection with corresponding PCT Application No. PCT/US02/03006.

* cited by examiner

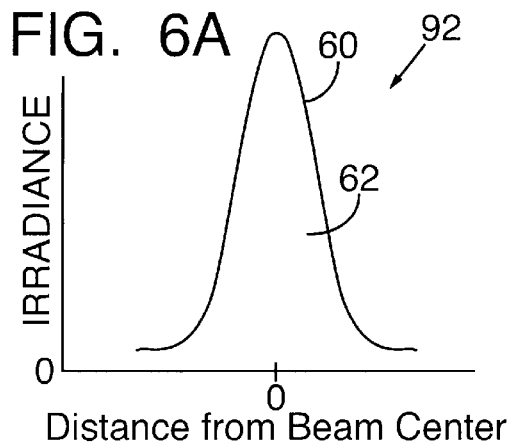
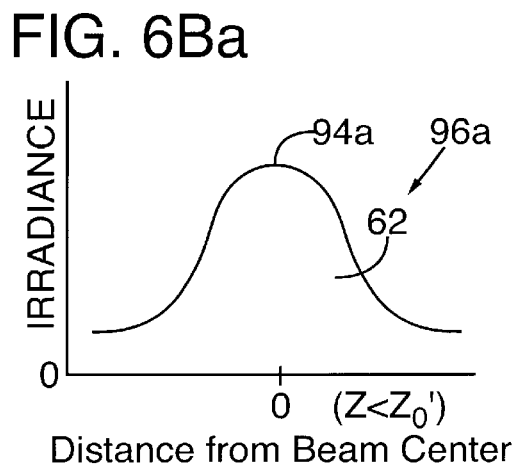
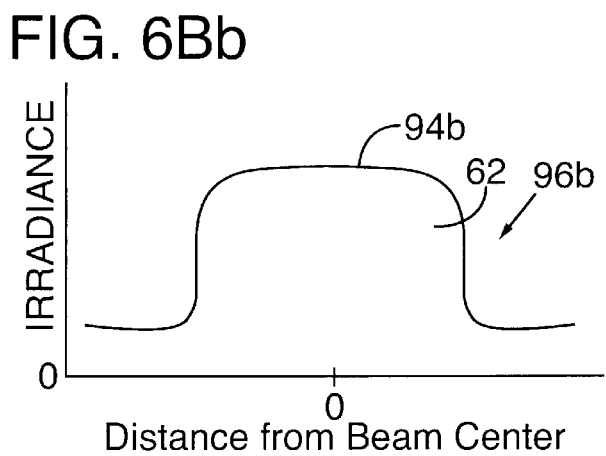
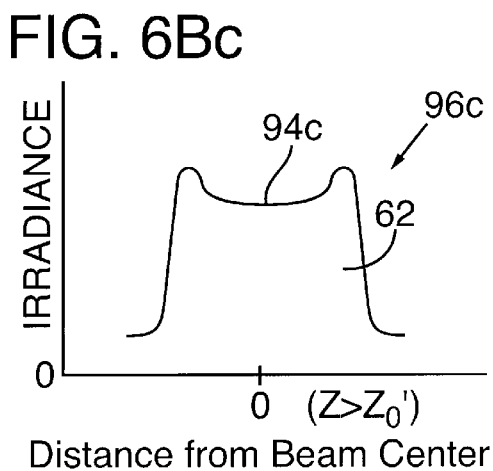
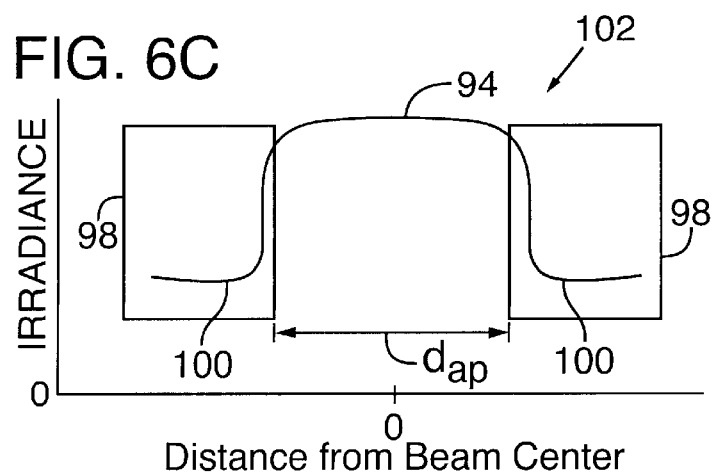

US 6,534,743 B2

RESISTOR TRIMMING WITH SMALL UNIFORM SPOT FROM SOLID-STATE UV LASER

RELATED APPLICATIONS

This patent application derives priority from U.S. Provisional Application No. 60/266,172, filed Feb. 1, 2001, and from U.S. Provisional Application No. 60/301,706, filed Jun. 28, 2001.

FEDERALLY SPONSORED RESEARCH OR DEVELOPMENT

Not applicable

TECHNICAL FIELD

The present invention relates to laser trimming and, in particular, to laser trimming thick or thin film resistors with a uniform spot from a solid-state laser.

BACKGROUND OF THE INVENTION

Conventional laser systems are typically employed for processing targets such as electrically resistive or conductive films of passive electrical component structures, such as film resistors, inductors, or capacitors, in circuits formed on ceramic or other substrates. Laser processing to trim the resistance values of film resistors may include passive, functional, or activated laser trimming techniques such as described in detail in U.S. Pat. No. 5,685,995 of Sun et al.

The following background is presented herein only by way of example to thick film resistors. FIG. 1 is an isometric view of a work piece 10, such as a prior art thick-film resistor 10a, forming part of a hybrid integrated circuit device, and FIG. 2 is a cross-sectional side elevation view depicting thick-film resistor 10a receiving a conventional laser output pulse 12. With reference to FIGS. 1 and 2, a conventional thick-film resistor 10a typically comprises a thick film layer 14 of a ruthanate or ruthinium oxide material extending between and deposited on portions of the top surfaces of metallic contacts 16. Layer 14 and metallic contacts 16 are supported upon a ceramic substrate 18, such as alumina. Modern ruthinium-based thick film pastes have been optimized to be stable after laser trimming with a 1.047 micron ($\mu$m) Nd:YLF laser or a 1.064 $\mu$m Nd:YAG laser.

With particular reference to FIG. 1, the resistance value of resistor 10a is largely a function of the resistivity of the resistor material and its geometry, including length 22, width 24, and height 26. Because they are difficult to screen to precise tolerances, thick-film resistors are intentionally screened to lower resistance than nomimal values and trimmed up to the desired values. Multiple resistors 10a having approximately the same resistance values are manufactured in relatively large batches and then subjected to trimming operations to remove incremental amounts of the resistor material until the resistance is increased to a desired value.

With particular reference to FIG. 2, one or more laser pulses 12 remove substantially the full height 26 of the resistor material within the spot dimensions 28 of laser output pulses 12, and overlapping spot dimensions 28 form a kerf 30. A simple or complex pattern can be trimmed through the resistor material of a resistor 10a to fine tune its resistance value. Laser pulses 12 are typically applied until resistor 10a meets a predetermined resistance value.

FIG. 3 is an isometric view of a portion of a prior art resistor 10 showing for convenience two common pattern trim paths 32 and 34 (separated by a broken line) between metal contacts 16. "L-cut" path 32 depicts a typical laser-induced modification. In an L-cut path 32, a first removal strip 36 of resistor material is removed in a direction perpendicular to a line between the contacts to make a coarse adjustment to the resistance value. Then an adjoining second removal strip 38, perpendicular to the first removal strip 36, may be removed to make a finer adjustment to the resistance value. A "serpentine cut" path 34 depicts another common type or laser adjustment. In a serpentine cut 34, resistor material is removed along removal strips 40 to increase the length of film path 42. Removal strips 40 are added until a desired resistance value is reached. Removal strips 36, 38, and 40 are typically the width of a single kerf 30 and represent the cumulative "nibbling" of a train of overlapping laser pulses 12 that remove nearly all of the resistor material within the prescribed patterns. Thus, when the trimming operation is completed, the kerfs 30 are "clean" with their bottoms being substantially free of resistor material such that the substrate 18 is completely exposed. Unfortunately, the formation of conventional clean kerfs 30 necessitates a slight laser impingement of the surface of substrate 18.

As film resistors become smaller, such as in the newer 0402 and 0201 chip resistors, smaller spot sizes are needed. With the 1.047 $\mu$m and 1.064 $\mu$m laser wavelengths, obtaining smaller spot sizes while employing conventional optics and maintaining the standard working distance (needed to avoid ablation debris and to clear the probes) and adequate depth of field (ceramic, for example, is not flat) is an ever-increasing challenge. The desire for even more precise resistance values also drives the quest for tighter trim tolerances.

An article by Albin and Swenson, entitled "Laser Resistance Trimming from the Measurement Point of View," *IEEE Transactions on Parts, Hybrids, and Packaging;* Vol. PHP-8, No. 2, June 1972, describes measurement issues and the advantages of using a solid-state laser for trimming thin film resistors.

Chapter 7 of an NEC instruction manual describes the challenges encountered when using an infrared (IR) Gaussian beam to trim resistors, particularly thick film resistors. Heat-affected zones (HAZ), cracks, and drift are some of the problems that are addressed.

An article by Swenson et al., entitled "Reducing Post Trim Drift of Thin Film Resistors by Optimizing YAG Laser Output Characteristics," *IEEE Transactions on Components, Hybrids, and Manufacturing Technology;* December 1978, describes using green (532 nm) solid-state laser Gaussian output for trimming thin film resistors to reduce HAZ and post trim drift.

U.S. Pat. Nos. 5,569,398, 5,685,995, and 5,808,272 of Sun and Swenson describe the use of nonconventional laser wavelengths, such as 1.3 $\mu$m, to trim films or devices to avoid damage to the silicon substrate and/or reduce settling time during functional trimming.

International Publication No. WO 99/40591 of Sun and Swenson, published Aug. 12, 1999, introduces the concept of resistor trimming with an ultraviolet (UV) Gaussian laser output. With reference to FIG. 4, they employ the UV Gaussian laser output to ablate an area 44 of the surface of film resistors to maintain their surface area and conserve their high frequency response characteristics. By intentionally retaining a depth 46 of resistor film in the trimmed areas 44, they avoid having to clean the kerf bottoms 48 and substantially eliminate the interaction between the laser output and the substrate 18, thereby eliminating any problems that might be caused by such interaction. Unfortunately, surface ablation trimming is a relatively slow process because the laser parameters must be carefully attenuated and controlled to avoid complete removal of the resistor film.

Microcracking is another challenge associated with using a solid-state Gaussian laser beam for trimming resistors. Microcracks, which often occur in the center of a kerf 30 on the substrate, may extend into the resistor film causing potential drift problems. Microcracks can also cause a shift associated with the temperature coefficient of resistance (TCR). Such microcracking is more pronounced in the newer 0402 and 0201 chip resistors that are fabricated on thinner substrates 18, with a typical height or thickness of about 100 to 200 µm, compared to those of traditional resistors. Microcracking in these thinner-substrate resistors can propagate and even result in catastrophic failure or physical breakage, particularly along the trim kerf 30, of the resistor during subsequent handling. Microcracking can also create "preferred" break lines that are more pronounced than the desirable break prescribed break lines in snapstrates.

Improved resistor trimming techniques are, therefore, desirable.

SUMMARY OF THE INVENTION

An object of the invention is, therefore, to provide an improved system and/or method for solid-state laser trimming.

Another object of the invention is to provide spot sizes of less than 20 µm to trim smaller chip resistors, such as 0402 and 0201 chips resistors.

Some of the microcracking may be caused by the high intensity center of the Gaussian beam spot in much the same way that a Gaussian beam may be responsible for damaging the center of a blind via in a laser drilling operation (although the targets and substrates are different materials). International Publication No. WO 00/73013 of Dunsky et al., published Dec. 7, 2000, describes a method for creating and employing an imaged shaped Gaussian beam to provide a uniform laser spot, particularly useful for via drilling operations.

An article by Swenson, Sun, and Dunsky, entitled "Laser Machining in Electronics Manufacturing: A Historical Overview," *SPIE's 45th Annual Meeting, The international Symposium on Optical Science and Technology;* Jul. 30–Aug. 4, 2000, describes an improved surface scanning method using a 40 µm uniform spot formed by a lens described by Dickey et al. in U.S. Pat. No. 5,864,430.

The present invention preferably employs a uniform spot, such as an imaged shaped Gaussian spot or a clipped Gaussian spot, that is less than 20 µm in diameter and imparts uniform energy across the bottom of a kerf 30, thereby minimizing the amount and severity of microcracking. Where appropriate, these spots can be generated in an ablative, nonthermal, UV laser wavelength to reduce the HAZ and/or shift in TCR. These techniques can be employed for both thin and thick film resistor processing.

Additional objects and advantages of this invention will be apparent from the following detailed description of preferred embodiments thereof which proceeds with reference to the accompanying drawings.

BRIEF DESCRIPTION OF THE DRAWINGS

FIGS. 6A–6C is a sequence of simplified irradiance profiles of a laser beam as it changes through various system components of the laser system of FIG. 5.

DETAILED DESCRIPTION OF PREFERRED EMBODIMENTS

Figure 1:
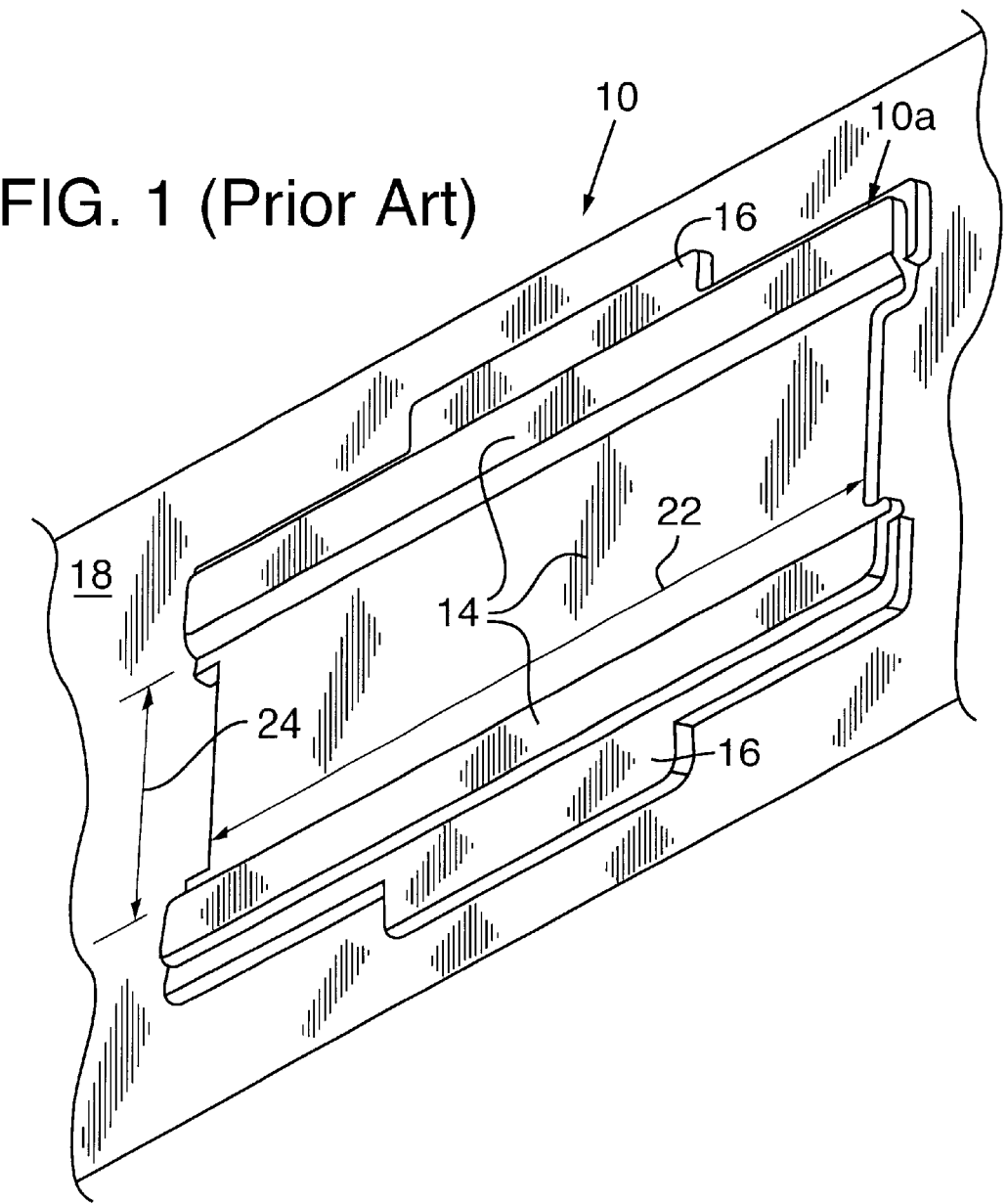
FIG. 1 is a fragmentary isometric view of a thick-film resistor.
Figure 2:
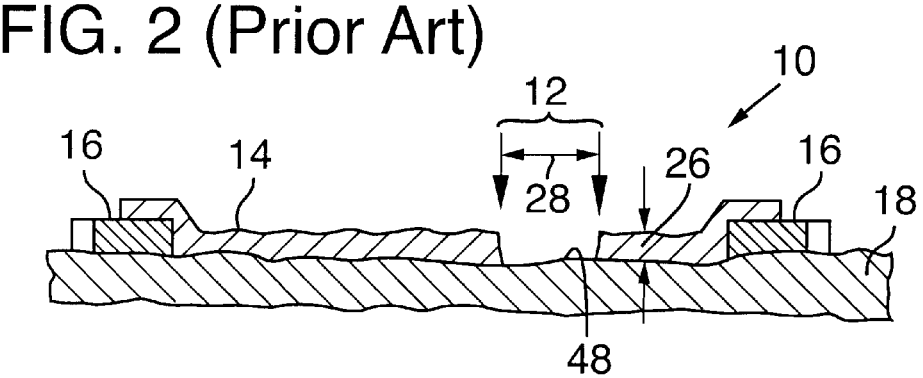
FIG. 2 is a cross-sectional side view of a thick-film resistor receiving laser output that removes the full thickness of resistor material.
Figure 3:
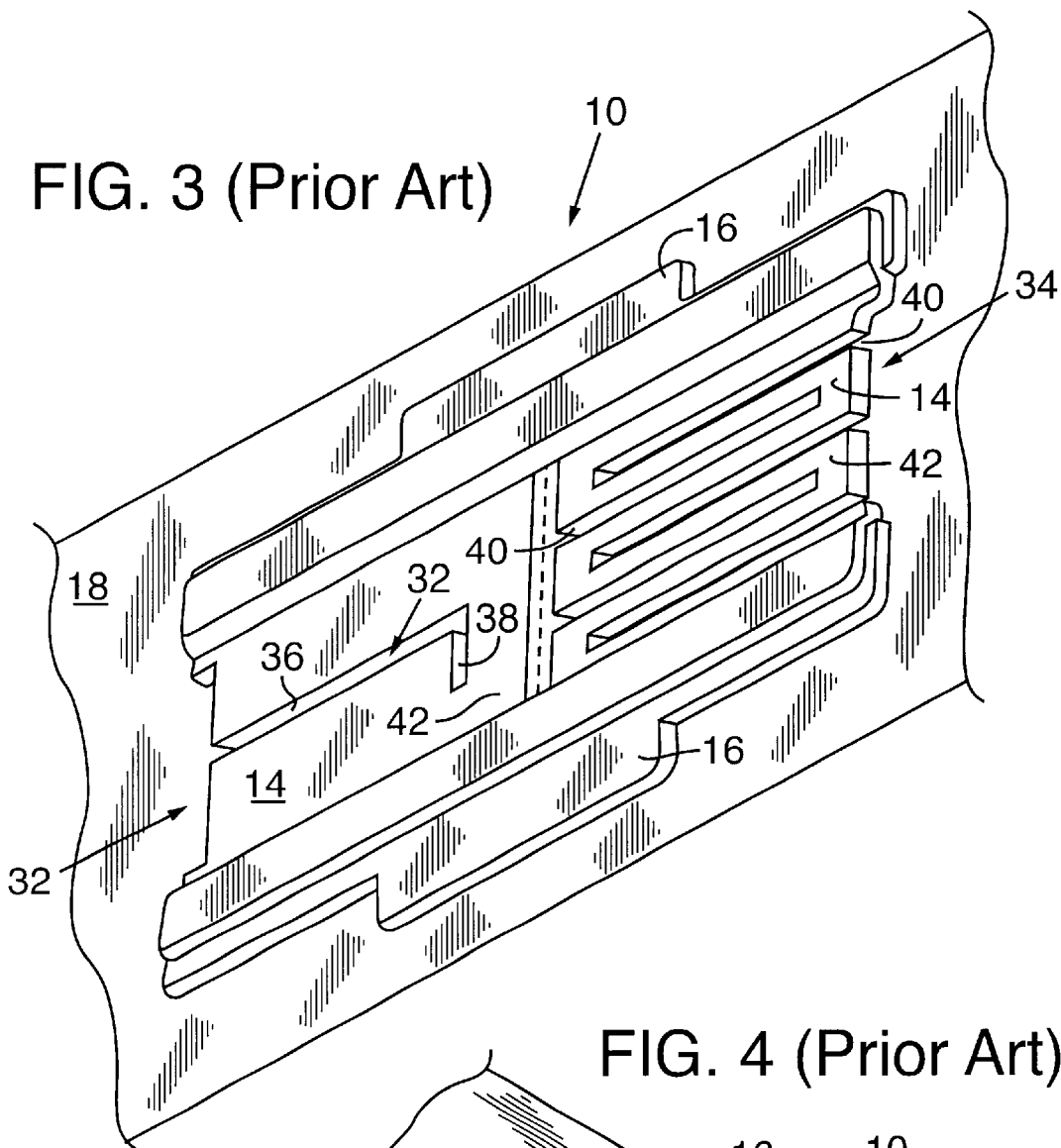
FIG. 3 is a fragmentary isometric view of a resistor showing two common prior art trim paths.
Figure 4:
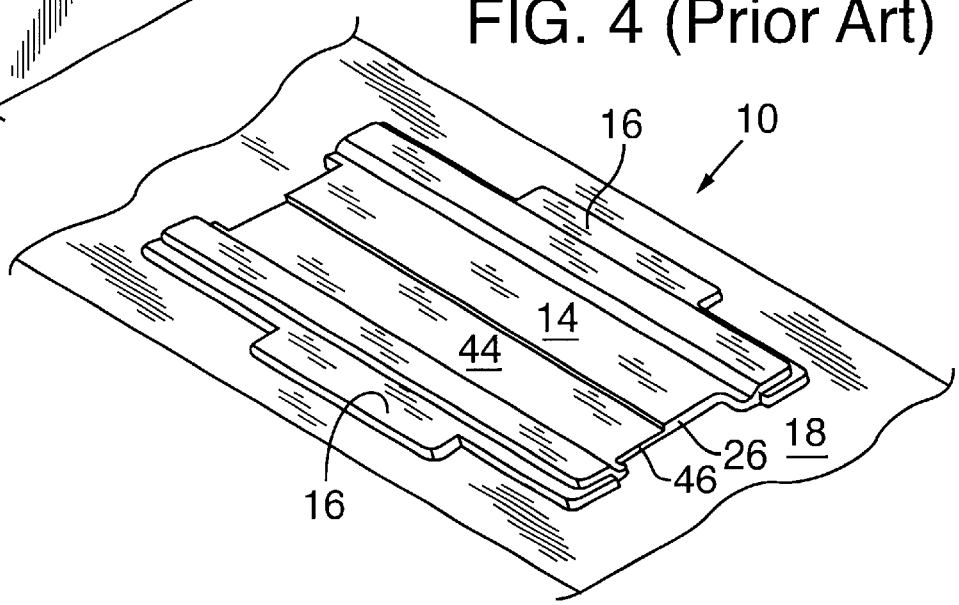
FIG. 4 is an isometric view of a thick-film resistor with a surface ablation trim profile.
Figure 5:
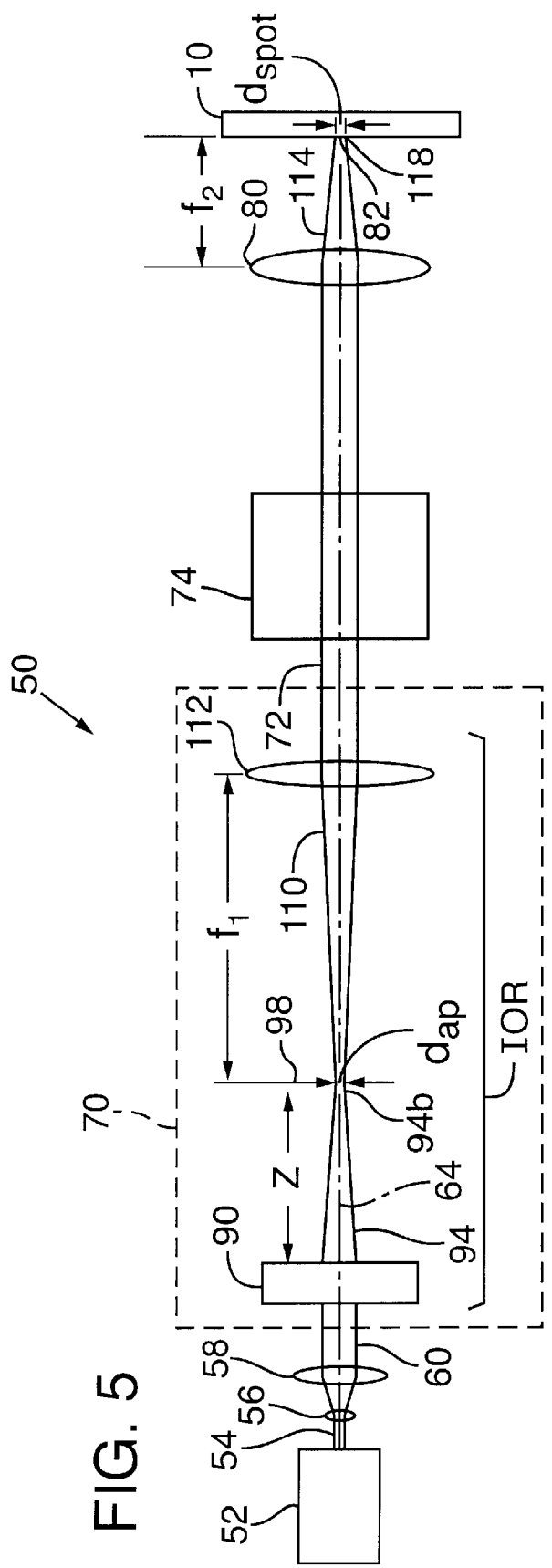
FIG. 5 is a simplified side elevation and partly schematic view of an embodiment of a laser system employed for trimming films in accordance with the present invention.

With reference to FIG. 5, a preferred embodiment of a laser system 50 of the present invention includes Q-switched, diode-pumped (DP), solid-state (SS) UV laser 52 that preferably includes a solid-state lasant such as Nd:YAG, Nd:YLF, or Nd:YVO$_4$. Laser 52 preferably provides harmonically generated UV laser pulses or output 54 at a wavelength such as 355 nm (frequency tripled Nd:YAG), 266 nm (frequency quadrupled Nd:YAG), or 213 nm (frequency quintupled Nd:YAG) with primarily a TEM$_{00}$ spatial mode profile. Skilled persons will appreciate that other wavelengths and their harmonics are available from the other listed lasants. For example, preferred YLF wavelengths include 349 nm and 262 nm. Skilled persons will also appreciate that most lasers 52 do not emit perfect Gaussian output 54; however, for convenience, Gaussian is used herein liberally to describe the irradiance profile of laser output 54. Laser cavity arrangements, harmonic generation, and Q-switch operation are all well known to persons skilled in the art. Details of exemplary lasers 52 are described in International Publication No. WO 99/40591 of Sun and Swenson.

Although other solid-state laser wavelengths, such as green (e.g. 532 nm) or IR (e.g. 1.06 µm or 1.32 µm), could be employed, a UV laser wavelength is preferred for trimming because it has an ablative, relatively nonthermal nature that reduces post trim drift. A UV laser wavelength also inherently provides a smaller spot size at the surface of workpiece 10 than provided by an IR or green laser wavelength employing the same depth of field.

UV laser pulses 54 may be passed through a variety of well-known optics including beam expander and/or upcollimator lens components 56 and 58 that are positioned along beam path 64. UV laser pulses 54 are then preferably directed through a shaping and/or imaging system 70 to produce uniform pulses or output 72 that is then preferably directed by a beam positioning system 74 to target uniform output 72 through a scan lens 80 (The scan lens is also commonly referred to as a "second imaging," focusing, cutting, or objective lens.) to a desired laser target position 82 at the image plane on a workpiece 10, such as thick film resistors 10a or thin film resistors. Uniform output 72 preferably comprises laser output that has been truncated (clipped), focused and clipped, shaped, or shaped and clipped.

Imaging system 70 preferably employs an aperture mask 98 positioned between an optical element 90 and a collection or collimation lens 112 and at or near the focus of the beam waist created by optical element 90. Aperture mask 98 preferably blocks any undesirable side lobes in the beam to present a spot profile of a circular or other shape that is subsequently imaged onto the work surface. Moreover, varying the size of the aperture can control the edge sharpness of the spot profile to produce a smaller, sharper-edged intensity profile that should enhance the alignment accuracy. In addition, the shape of the aperture can be precisely circular or also be changed to rectangular, elliptical, or other noncircular shapes that can be used advantageously for resistor trimming.

Mask 98 may comprise a material suitable for use at the wavelength of laser output 54. If laser output 54 is UV, then mask 98 may for example comprise a UV reflective or UV absorptive material, but is preferably made from a dielectric material such as UV grade fused silica or sapphire coated with a multilayer highly UV reflective coating other UV resistant coating. The aperture of mask 98 may optionally be flared outwardly at its light exiting side.

Optical element 90 may comprise focusing optics or beam shaping components such as aspheric optics, refractive binary optics, deflective binary optics, or diffractive optics. Some or all of these may be employed with or without the aperture mask 98. In one preferred embodiment, a beam shaping component comprises a diffractive optic element (DOE) that can perform complex beam shaping with high efficiency and accuracy. The beam shaping component not only transforms the Gaussian irradiance profile of FIG. 6A to the near-uniform irradiance profile of FIG. 6Bb, but it also focuses the shaped output 94 to a determinable or specified spot size. Both the shaped irradiance profile 94b and the prescribed spot size are designed to occur at a design distance $Z_0$ down stream of optical element 90. Although a single element DOE is preferred, skilled persons will appreciate that the DOE may include multiple separate elements such as the phase plate and transform elements disclosed in U.S. Pat. No. 5,864,430 of Dickey et al., which also discloses techniques for designing DOEs for the purpose of beam shaping.

FIGS. 6A–6C (collectively FIG. 6) show a sequence of simplified irradiance profiles 92, 96, and 102 of a laser beam as it changes through various system components of laser system 50. FIGS. 6Ba–6Bc show simplified irradiance profiles 96a–96c of shaped output 94 (94a, 94b, and 94c, respectively) as a function of distance Z with respect to $Z_0'$. $Z_0'$ is the distance where shaped output 94 has its flattest irradiance profile shown in irradiance profile 96b. In a preferred embodiment, $Z_0'$ is close to or equal to distance $Z_0$.

With reference again to FIGS. 5 and 6, a preferred embodiment of shaped imaging system 70 includes one or more beam shaping components that convert collimated pulses 60 that have a raw Gaussian irradiance profile 92 into shaped (and focused) pulses or output 94b that have a near-uniform "top hat" profile 96b, or particularly a super-Gaussian irradiance profile, in proximity to an aperture mask 98 downstream of the beam shaping component. FIG. 6Ba shows an exemplary irradiance profile 94a where $Z<Z_0'$, and FIG. 6Bc shows an exemplary irradiance profile 94c where $Z>Z_0'$. In this embodiment, lens 112 comprises imaging optics useful for inhibiting diffraction rings. Skilled persons will appreciate that a single imaging lens component or multiple lens components could be employed.

The shaping and imaging techniques discussed above are described in detail in International Publication No. WO 00/73013 published on Dec. 7, 2000. The relevant portions of the disclosure of corresponding U.S. patent application No. 09/580,396 of Dunsky et al., filed May 26, 2000 are herein incorporated by reference.

Figure 7A:
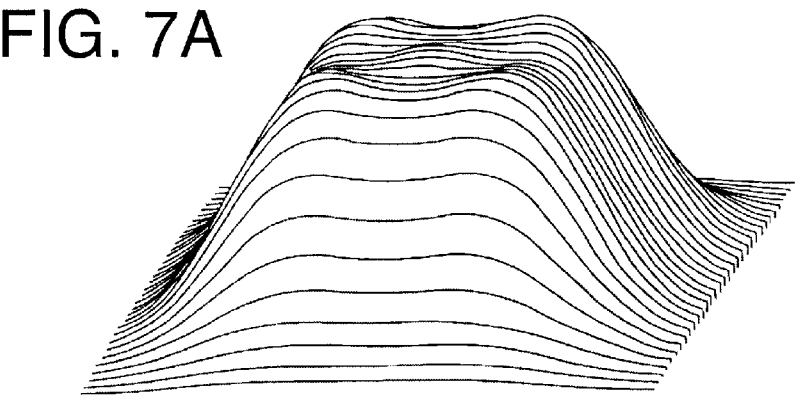
FIGS. 7A–7D are exemplary substantially uniform square or circular irradiance profiles.
Figure 7B:
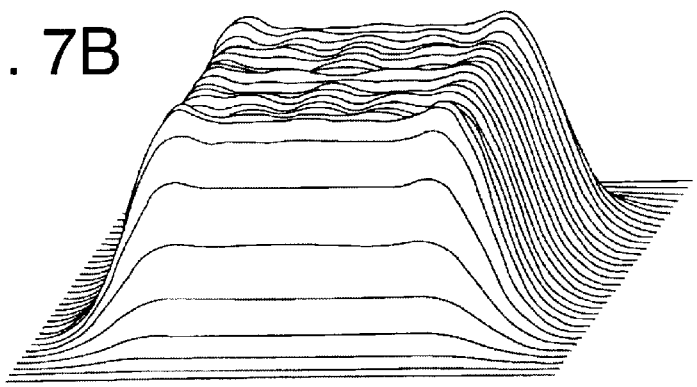
Figure 7C:
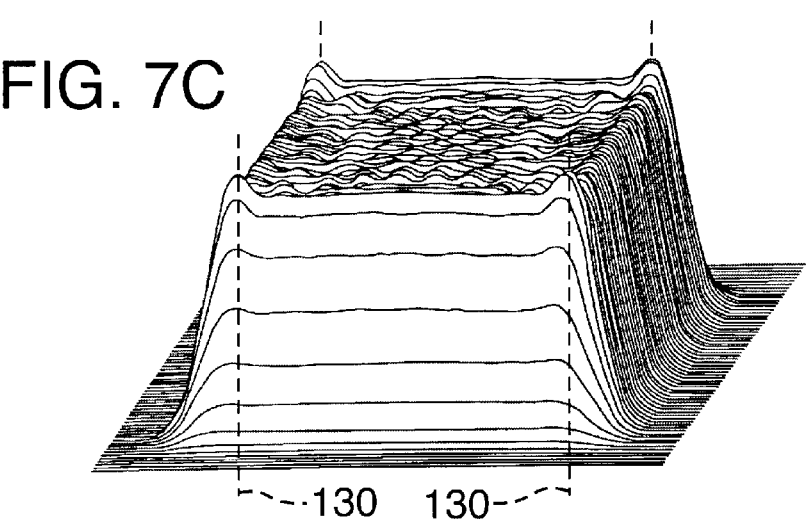
Figure 7D:
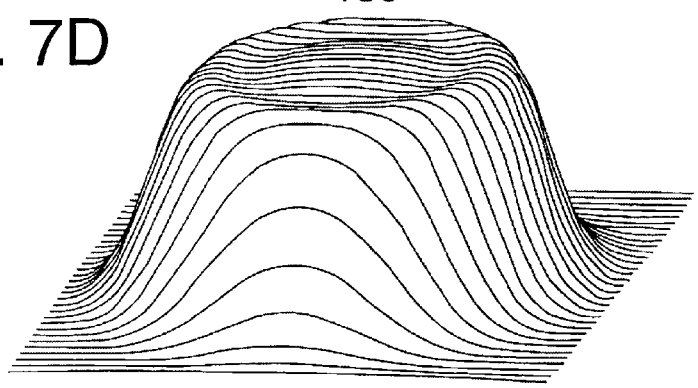

FIGS. 7A–7D (collectively FIG. 7) show exemplary substantially uniform irradiance profiles produced by a Gaussian beam propagating through a DOE as described in U.S. Pat. No. 5,864,430. FIGS. 7A–7C show square irradiance profiles, and FIG. 7D shows a cylindrical irradiance profile. The irradiance profile of FIG. 7C is "inverted," showing higher intensity at its edges than toward its center. Skilled persons will appreciate that beam shaping components 90 can be designed to supply a variety of other irradiance profiles that might be useful for specific applications, and these irradiance profiles typically change as a function of their distance from $Z_0'$. Skilled persons will appreciate that a cylindrical irradiance profile such as shown in FIG. 7D is preferably employed for circular apertures 98; cuboidal irradiance profiles would be preferred for square apertures; and the properties of other beam shaping components 90 could be tailored to the shapes of other apertures. For example, for many straight forward via trimming applications, an inverted cuboidal irradiance profile with a square aperture in mask 98 could be employed.

Beam positioning system 74 preferably employs a conventional positioner used for laser trimming systems. Such a positioning system 74 typically has one or more stages that move workpiece 10. The positioning system 74 can be used for moving laser spots of shaped output 118 in an overlapping manner to form kerfs 30 along trim paths 32 or 34. Preferred beam positioning systems can be found in ESI's Model 2300, Model 4370, or soon to be released Model 2370 Laser Trimming Systems commercially available from Electro Scientific Industries, Inc. of Portland, Oreg. Other positioning systems can be substituted and are well known to practitioners in the laser art.

An example of a preferred laser system 50 that contains many of the above-described system components employs a UV laser (355 nm or 266 nm) in a Model 5200 laser system or others in its series manufactured by Electro Scientific Industries, Inc. in Portland, Oreg. Persons skilled in the art will appreciate, however, that any other laser type having a Gaussian beam intensity profile (before imaging or shaping as disclosed herein), other wavelengths such as IR, or other beam expansion factors can be employed.

Laser system 50 is capable of producing laser system output 114 having preferred parameters of typical resistor trimming windows that may include: an ultraviolet wavelength, preferably between about 180–400 nm; average power densities greater than about 100 mW, and preferably greater than 300 mW; spot size diameters or spatial major axes of about 5 µm to greater than about 50 µm; a repetition rate of greater than about 1 kHz, preferably greater than about 5 kHz or even higher than 50 kHz; temporal pulse widths that are shorter than about 100 ns, and preferably from about 40–90 ns or shorter; a scan speed of about 1–200 mm/sec or faster, preferably about 10–100 mm/sec, and most preferably about 10–50 mm/sec; and a bite size of about 0.1–20 µm, preferably 0.1–10 µm, and most preferably 0.1–5 µm. The preferred parameters of laser system output 114 are selected in an attempt to circumvent thermal or other undesired damage to substrates 18. Skilled persons will appreciate that these output pulse parameters are interdependent and are dictated by the performance required.

Skilled persons will also appreciate that the spot area of laser system output 114 is preferably circular or square, but other simple shapes such as ellipses and rectangles may be useful and even complex beam shapes are possible with the proper selection of optical elements 90 cooperating with a desirable aperture shape in mask 98. Preferred spot areas for laser trimming, more particularly for UV laser trimming, are preferably smaller than about 40 µm in diameter, more preferably smaller than about 20 µm in diameter, and most preferably smaller than about 15 µm in diameter. Skilled persons will appreciate that because the spot size of the UV laser output is smaller than the spot size of conventional laser trimming output and because uniform output 72 permits kerfs 30 to have straight uniform walls or edges and thus a smaller HAZ, resistors 10*a* can be trimmed to tolerances that are tighter than the tolerances possible for conventional kerf trimming techniques.

One difference between the Gaussian output 54 and imaged shaped output 118 is that pulse 94 uniformly illuminates the aperture of mask 98 at all points while the Gaussian output 54 has a higher energy density or "hot spot" at its center that may increase microcracking and other undesirable damage to ceramic substrate 18. The imaged shaped output 118 consequently facilitates formation of kerfs 30 with a very flat and uniform bottom 48 at or into ceramic substrate 18, and this flatness and uniformity are not possible with an unmodified Gaussian output 54. Moreover, the imaged shaped output 118 can also clean the resistor material from the bottom edges of the kerfs 30 more completely without risking undesirable damage to the underlying substrate 18 because the uniform shape of pulse 94 virtually eliminates the possibility of creating a hot spot at the bottom center of the kerf 30, so the amount and severity of microcracks are minimized. The trimming speed can also be increased with imaged shaped output 118 over that obtainable with an unmodified Gaussian output 54. Imaged shaped output 118 can be applied at greater laser power than can Gaussian because "hot spot" damage potential can be eliminated so the bite size, repetition rate, and beam movement speed can be favorably adjusted to trim faster.

Figure 8:
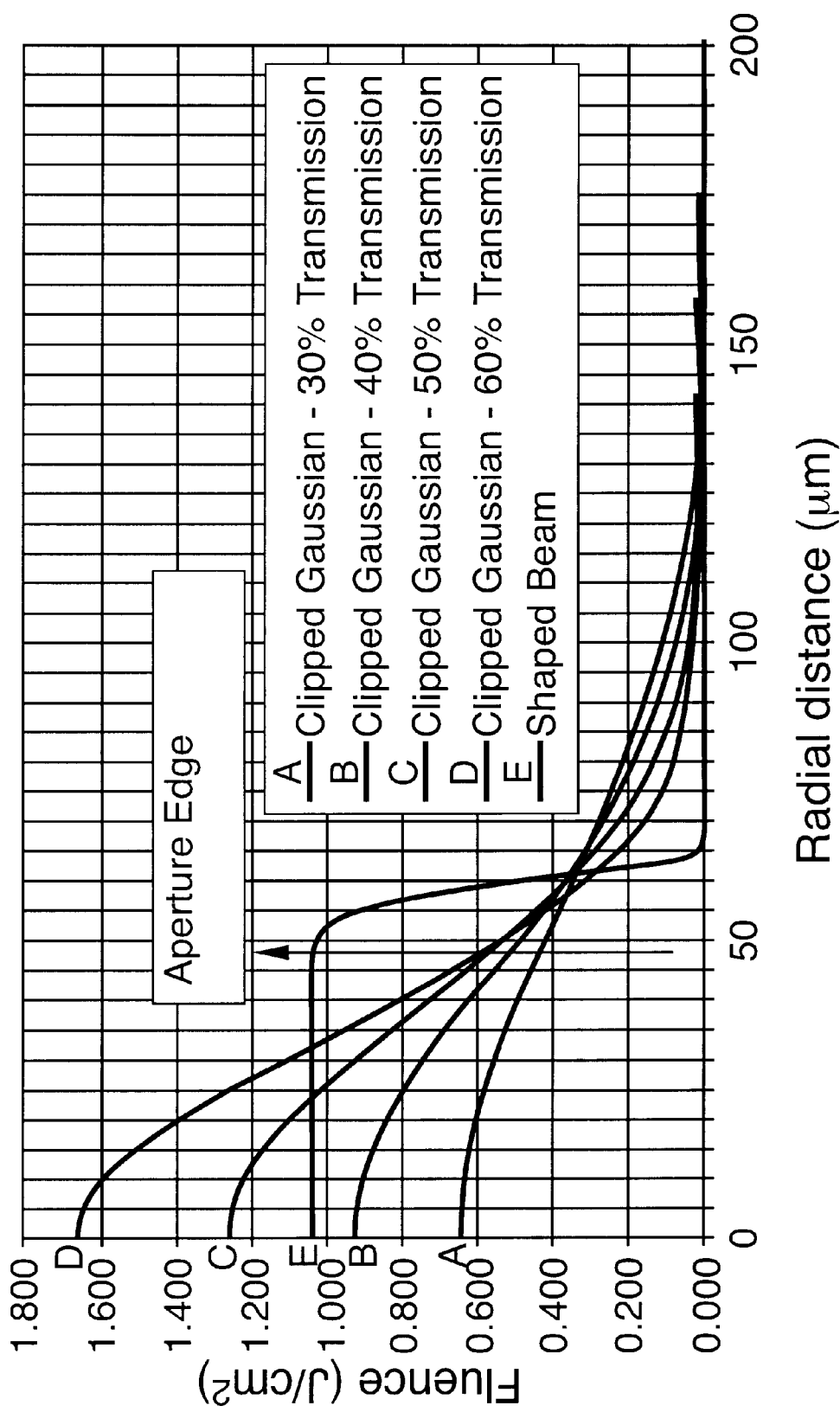
FIG. 8 is a graphical comparison of ideal fluence distributions at the aperture plane for imaged shaped output and clipped Gaussian output at several typical transmission levels under exemplary laser processing parameters.

Although a clipped Gaussian spot can alternatively be employed advantageously over Gaussian output 54, substantially more energy would have to be sacrificed to obtain desirable uniformity than with an image shaped output 118. The imaged shaped output 118 also provides cleaner bottom edges and faster trimming speed than does clipped Gaussian output. FIG. 8 shows a comparison of ideal fluence profiles at the aperture plane for shaped output 94*b* and clipped Gaussian output at several exemplary transmission levels under typical laser processing parameters. Fluence levels on the workpiece 10 are equal to the aperture fluence levels multiplied by the imaging de-magnification factor squared. In one example, fluences at the aperture edge were about 1.05 J/cm$^2$ and 0.60 J/cm$^2$ or less for shaped output 94*b* and clipped Gaussian output, respectively. Thus, at workpiece 10, the fluences at the edge of the imaged spot (kerf edge) were about 7.4 and 4.3 J/cm$^2$ for the imaged shaped output 118 and clipped Gaussian output, respectively. The rate at which typical resistor materials can be ablated typically differs between the center and edge fluence levels. As a result, processing of each kerf 30 can be completed in fewer pulses, with faster scanning speed, or with larger bite sizes (or smaller pulse overlaps) with the imaged shaped output 118, increasing the process throughput.

An example of a strategy for trimming with imaged shaped output 118 in accordance with these considerations of present invention is described below. The fluence across the entire imaged spot can be maintained, for example, at 90% of the value at which unacceptable ceramic penetration or damage occurs, $F_{damage}$. For example, acceptable ceramic penetration into thick film resistors is typically less than 10 µm and preferably less than 5 µm. The resistor material is then ablated at conditions which will not cause damage such as significant microcracking. In contrast, with the clipped Gaussian beam at T=50%, one could maintain the center of the spot at this fluence, in which case the edges would be at only 45% of $F_{damage}$. Alternatively, the spot edge could be held at 90% of $F_{damage}$, in which case the center would be at 180% of the damage threshold fluence, resulting in substantial damage. Maintaining the edges of the imaged spot at high fluence enables the resistor material to be cleared from the kerf edges with fewer laser pulses, since each pulse removes more material. Thus, the trimming throughput of imaged shaped output 118 can be much greater than that of the clipped Gaussian output.

In addition to being able to clean resistor material from the bottom edges of the kerfs 30 faster as discussed above, the imaged shaped output 118 can also clean the resistor material from the bottom edges of the kerfs 30 more completely without risking damage to the underlying ceramic substrate 18 because the uniform shape of pulse 94 virtually eliminates the possibility of creating a hot spot at the bottom center of the kerf 30

With respect to kerf quality, the imaged shaped output 118 of the present invention also provides for a very precise laser spot geometry and permits better taper minimizing performance at higher throughput rates than that available with Gaussian or clipped Gaussian output, thus providing crisper edges than available with Gaussian output 54. The uniform energy across the bottom of the kerfs 30 and the formation of more precise edges provides more predictable trim results, including enhanced repeatability and positioning accuracy for smaller target areas.

Figure 9:
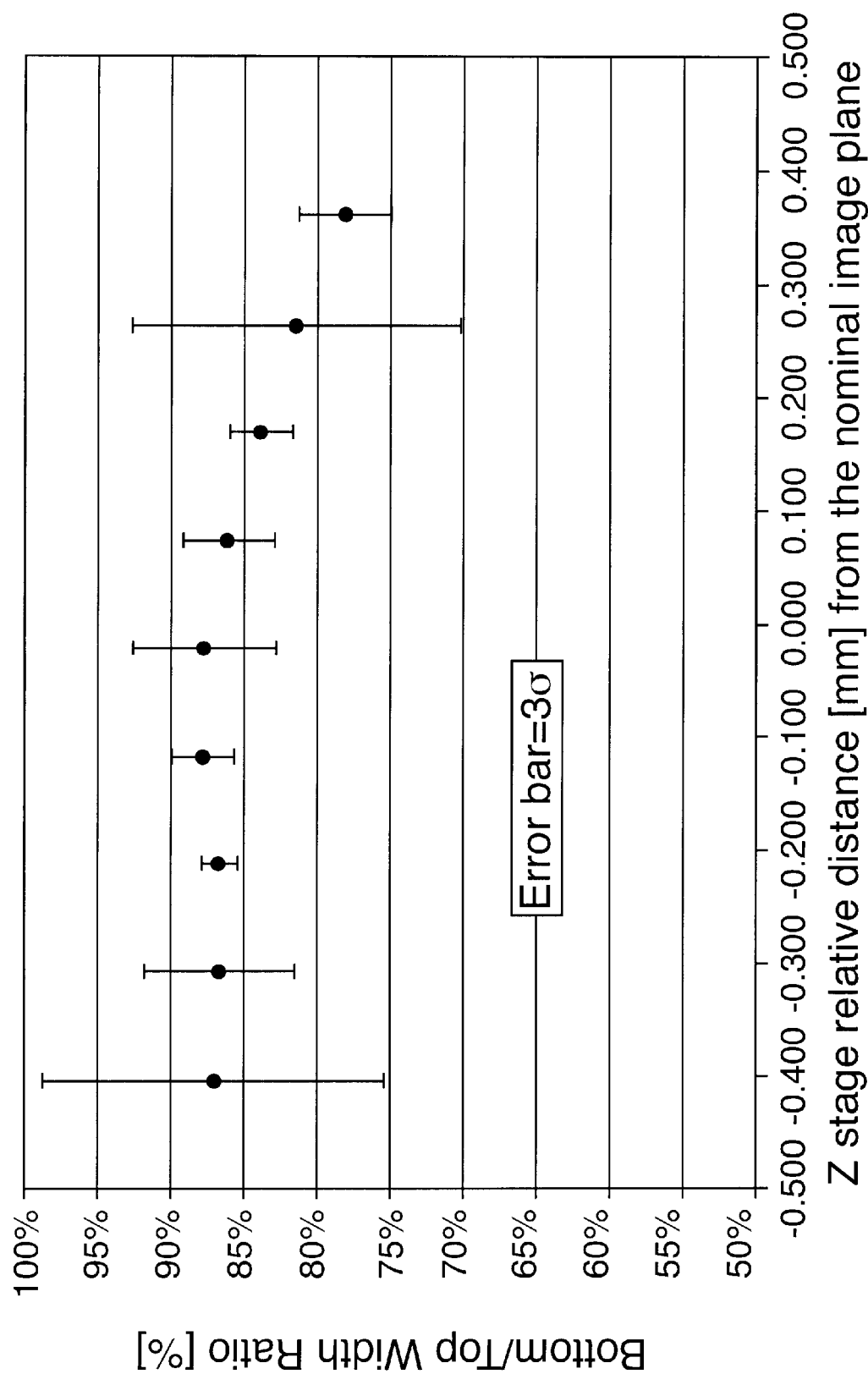
FIG. 9 is a graph of via taper ratio as a function of work surface location relative to the nominal image plane.

FIG. 9 shows the ratio of kerf bottom width to the kerf top width as a function work surface location relative to the nominal image plane, z=0. With reference to FIG. 9, the nominal image plane is the location where the kerfs 30 are most taper free, with the most sharply defined top edges. Positive values of z represent planes below the nominal image plane, i.e., with the workpiece 10 placed farther from the system optics than distance of separation where z=0. The 3σ error bar is shown for reference because bottom width measurements may be difficult to measure reliably. The largest bottom/top ratio is achieved at the image plane where z=0. Throughout a ±400 µm range, the bottom/top ratio was always greater than 75% at high throughput.

Figure 10:
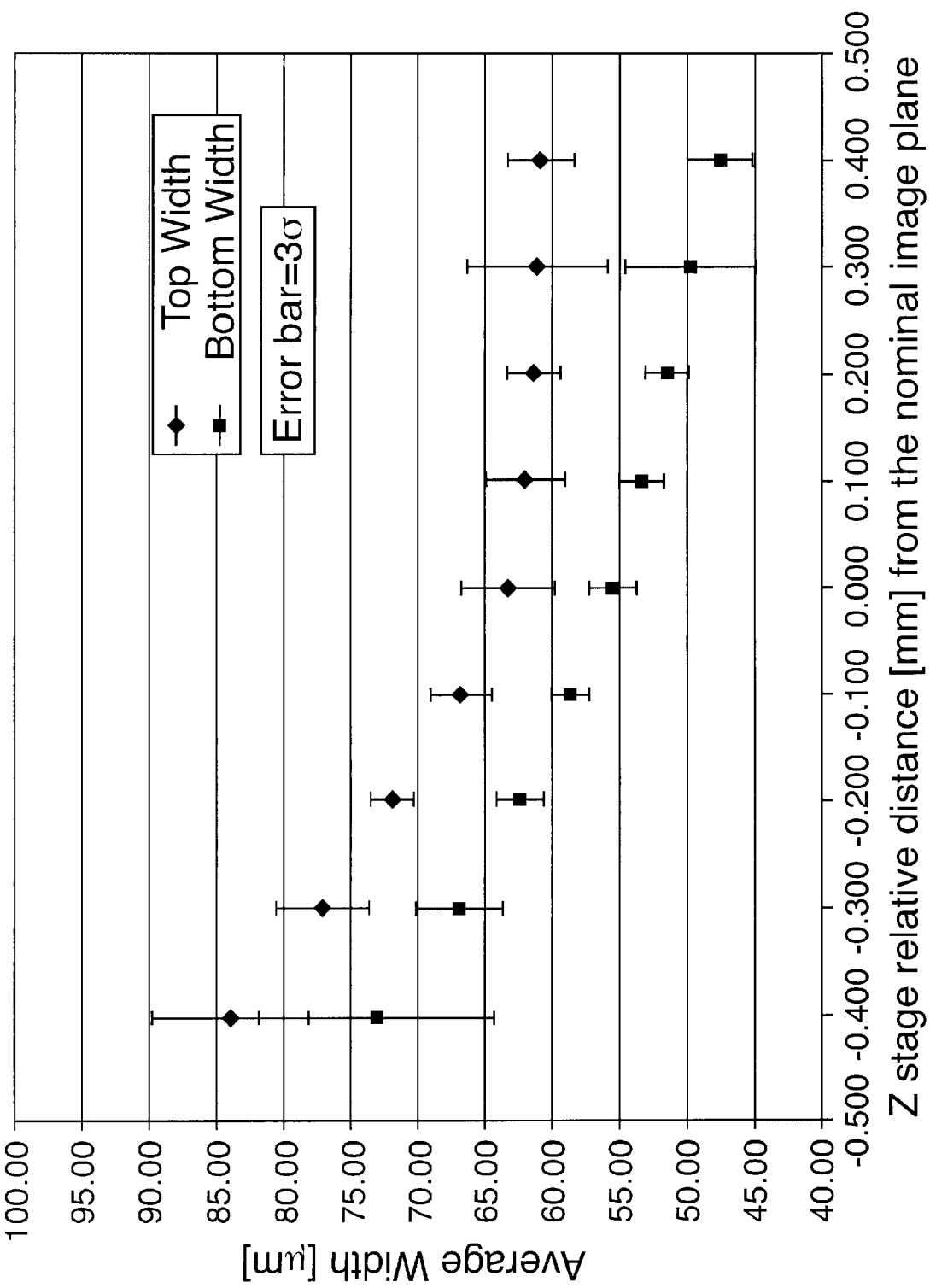
FIG. 10 is a graph of via diameter as a function of work surface location relative to the nominal image plane.

FIG. 10 shows kerf width as a function of work surface location relative to the nominal image plane, where z=0. As the workpiece 10 is moved further above the nominal image plane, the average kerf top width increases steadily. For locations below z=0, the top width remains fairly constant out to 400 µm below the image plane. The 3σ widths are generally held to within ±3 µm of the average value, with exceptions at z=+300 μm and z=−300 μm. For the bottom width, in contrast, the average value decreases steadily from locations above to locations below the nominal image plane. Because the width of the kerf bottom is significantly more difficult to control than the size of the kerf top, the bottom width is shown for reference only. Statistical process control techniques that could be applied to laser system 50 are, therefore, applicable to the characteristics of the kerf tops.

The data in FIGS. 9 and 10 suggest several approaches to managing depth of focus issues for process robustness. If one wishes to maintain a constant kerf top width over varying material thicknesses and machine conditions, it would be advantageous to set up the process with the work surface located slightly below the nominal image plane at, say z=+200 μm. This would produce a zone of ±200 μm of z variation that could be accommodated with very little effect on the top diameter. If, on the other hand, it is more desirable to maintain a constant kerf bottom/top diameter ratio, it would be better to set up the process with workpiece 10 located exactly at the nominal image plane. This would ensure that the bottom/top ratio would decrease by no more than 5% over a z range of at least ±200 μm. The viability of either of these approaches depends on whether the other kerf characteristics remain within acceptable limits as workpiece 10 moves away from the nominal image plane.

Moreover, beam shaping components 90 can be selected to produce pulses having an inverted irradiance profile shown in FIG. 7C that is clipped outside dashed lines 130 to facilitate removal of resistor material along the outer edges of kerf 30 and thereby further improve taper. The present invention permits a taper ratio of greater than 80% at a maximum throughput without undesirable damage to ceramic substrate 18, and taper ratios of greater than 95% (for low aspect ratio kerfs 30) are possible without undesirable damage to ceramic substrate 18. Better than 75% taper ratios are even possible for the smallest kerf widths, from about 5–18 μm width at the kerf top, of the deepest kerfs 30, with conventional optics. Although taper ratio is typically not a critical consideration in many trimming operations other than the extent to which it impacts kerf widths on small resistors 10a, the high taper ratios achievable with the present invention are further evidence of kerf bottom uniformity.

The trimming techniques disclosed herein can be employed for both thick and thin film resistor processing applications as described in any of the references cited in the background of the invention, including partial depth trimming. With respect to thick film resistors, particularly ruthenium oxide on ceramic including the 0402 and 0201 chip resistors with a ruthenium layer height or thickness of less than about 200 μm, the preferred trimming criterion is to remove all of the ruthenium within the kerfs 30 with a minimal amount of penetration into the ceramic substrate 18. These desirable kerfs 30 are clean such that ceramic material is uniformly exposed and the bottom of the kerfs 30 are "white." Such cleaning often entails intentional penetration into the ceramic to a depth of about 0.1–5 μm and often at least 1 μm. The imaged shaped output 118 can provide these clean or white kerfs 30 without creating significant microcracking. UV is particularly preferred for processing resistor material over ceramic; however, other wavelengths may be employed.

Although a UV wavelength can be employed, an IR wavelength, particularly at about 1.32 μm, may be a preferred wavelength for employing a uniform spot to trim materials, such as NiCr, SiCr, or TaN, from silicon substrates, especially for trimming active or electro-optic devices and in applications involving functional trimming.

Skilled persons will appreciate that the uniform spot trimming techniques disclosed herein may be employed on single resistors, resistor arrays (including those on snapstrates), voltage regulators, capacitors, inductors, or any other device requiring a trimming operation. In addition, the uniform spot trimming techniques can be employed for surface ablation trimming or other applications where the imaged shaped output 118 does not penetrate the substrate 18, as well as the applications where substrate penetration is desirable.

Figure 11:
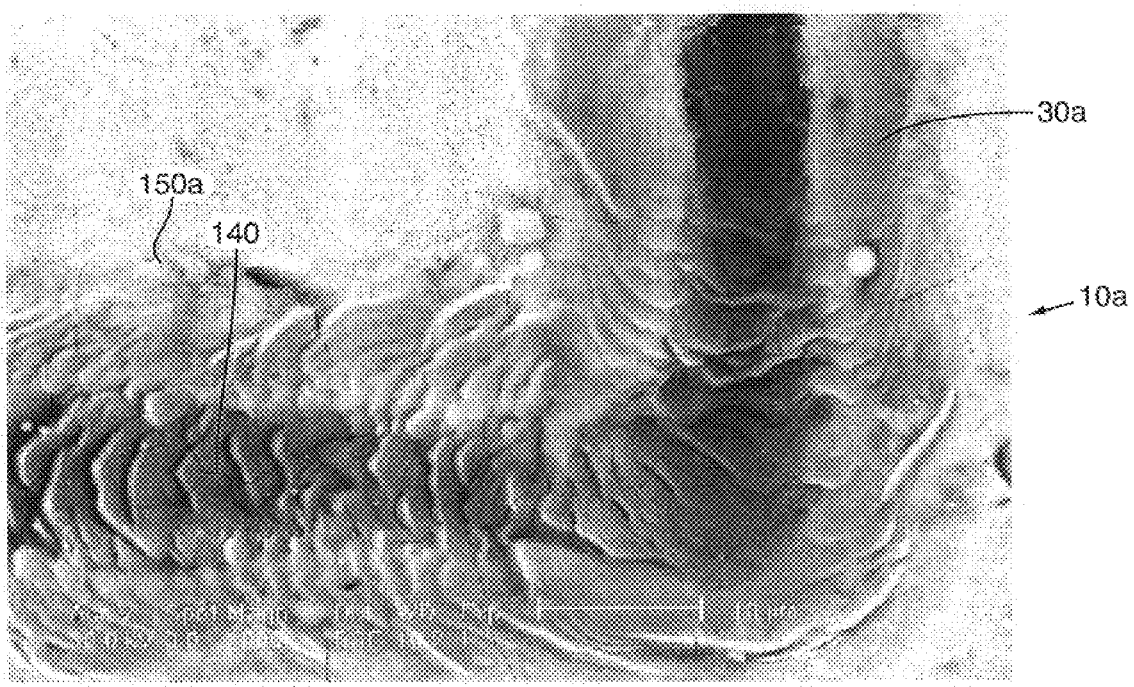
FIG. 11 is an electron micrograph of kerf showing microcracks formed in the substrate of a resistor trimmed by a Guassian beam.
Figure 12:
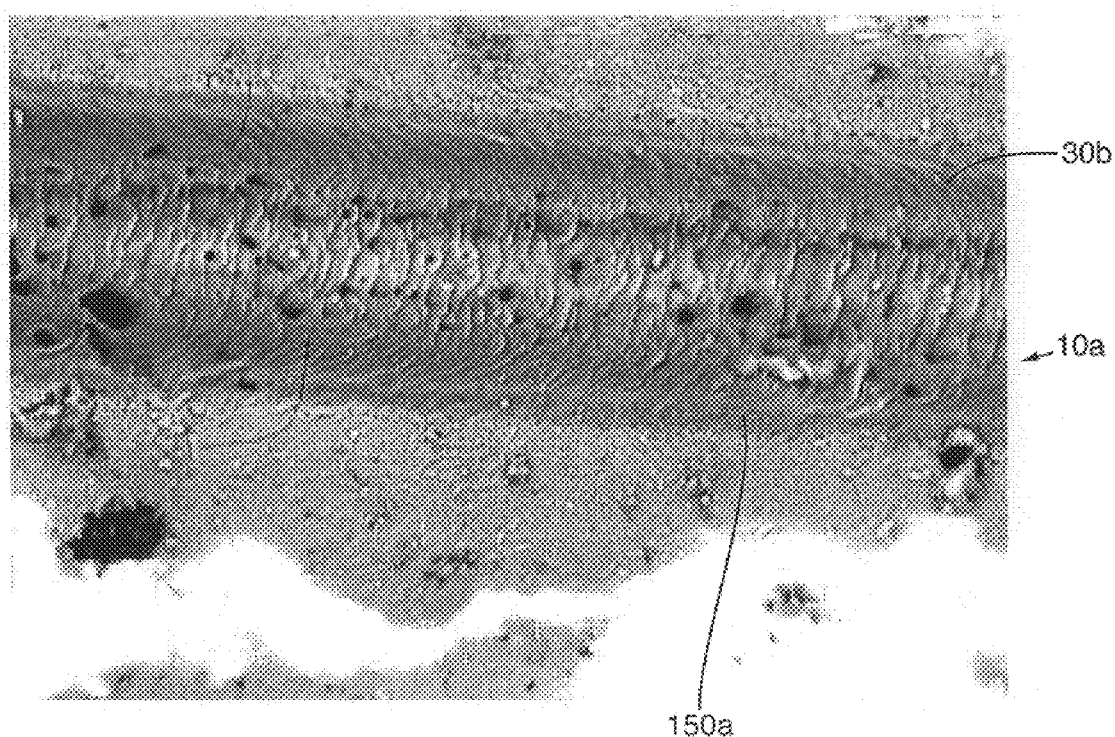
FIG. 12 is an electron micrograph of a kerf showing the absence of significant microcracks formed in the substrate of a resistor trimmed by a uniform spot.

FIGS. 11 and 12 are electron micrographs showing the differences in microcracking between a resistor 10a trimmed with a UV Gaussian beam (FIG. 11) and a resistor 10a trimmed with a UV uniform (imaged shaped) beam (FIG. 12). With reference to FIG. 11, a reisistor 10a was trimmed with a UV Gaussian output 54 having an average power of 0.6 W at a repetition rate of 14.29 kHz at a trim speed of 30 mm/sec with a bite size of 2.10 μm. The resulting kerf 30a exhibits numerous microcracks substantial microcracks 140, a substantially wide kerf edge 150a, and deep penetration into the ceramic substrate 18 at the center of kerf 30a. With reference to FIG. 12, a resistor 10a was trimmed with UV imaged shaped output 118 having an average power of 2.86 W at a repetition rate of 8 kHz at a trim speed of 32 mm/sec with a bite size of 4 μm. The resulting kerf 30b exhibits no undesirable damage with few if any microcracks. The kerf edges 150b are relatively narrow and the substrate penetration is shallow and substantially uniform.

It will be obvious to those having skill in the art that many changes may be made to the details of the above-described embodiments of this invention without departing from the underlying principles thereof. The scope of the present invention should, therefore, be determined only by the following claims.

What is claimed is:

1. A method of laser trimming a film resistor to change from an initial value to a nominal value a parameter of the resistor that includes a film resistor material supported on a substrate, the film resistor material contributing to a determination of the initial value of the parameter, the method comprising:

producing a Gaussian beam of at least one laser pulse of UV radiation having an energy density spatial profile of generally Gaussian shape;

propagating the Gaussian beam along an optical path through a beam shaping element to convert the Gaussian beam into a transformed beam having a more substantially uniform energy density spatial profile;

propagating a major portion of the transformed beam through an aperture to convert it into a target beam that forms a target spot with a substantially uniform energy density spatial profile;

directing the target beam onto a target area of the film resistor material to ablate the film resistor material within the target area of the resistor to change its initial value to the nominal value and penetrating the substrate to form a kerf through the film resistor material and uniformly expose a major portion of the substrate within the target area, the substantially uniform energy density spatial profile of the target spot having an effective energy density value that minimizes formations of microcracks in the substrate.

2. The method of claim 1 in which the substrate is penetrated to a depth of less than 10 μm.

3. The method of claim 1 in which the substrate is penetrated to a depth of at least 0.1 μm.

4. The method of claim 3 in which the substrate is penetrated to a depth of less than 5 µm.

5. The method of claim 1 in which the film resistor material comprises a thick film resistor material that includes ruthenium oxide.

6. The method of claim 5 in which the substrate comprises a ceramic material.

7. The method of claim 1 in which the resistor comprises a 0402 or 0201 chip resistor.

8. The method of claim 3 in which the resistor comprises a 0402 or 0201 chip resistor.

9. The method of claim 1 in which the substrate includes a ceramic material and the film resistor material includes a thin film resistor material.

10. The method of claim 9 in which the thin film resistor material includes a nickel chromium compound or a tantalum nitride compound.

11. The method of claim 1 in which the resistor film material constitutes one of multiple similar regions of resistor film material mutually spaced apart from each other and supported on the substrate and separated by precast scribe lines formed in the substrate for separating the multiple similar regions; each of the multiple similar regions of film material has opposite ends positioned between metallic conductors; and the substantially uniform energy density spatial profile of the target spot has an effective energy density value that minimizes in the substrate formations of microcracks of sizes and depths that cause in the substrate spurious break lines that are distinct from the precast scribe lines.

12. The method of claim 1 in which the kerfs have a bottom center and the substantially uniform energy density spatial profile of the target spot has an effective energy density value that minimizes formation of microcracks in the substrate at the bottom center of the kerfs.

13. The method of claim 1 in which the substantially uniform energy density spatial profile of the target spot has an effective energy density value that minimizes in the substrate or the film material formation of microcracks of sizes and depths that cause parameter value drift from the nominal value.

14. The method of claim 1 in which the kerf has a depth of at least 100 µm and side walls that exhibit a taper ratio of at least 75% at maximum throughput.

15. The method of claim 1 in which the target spot with the substantially uniform energy density profile has a major axis that is shorter than or equal to 20 µm.

16. The method of claim 1 further comprising:
generating the Gaussian beam from a Q-switched, diode-pumped, solid-state laser.

17. The method of claim 1 in which the Gaussian beam shaping element comprises a diffractive optical element.

18. The method of claim 1 in which the Gaussian beam comprises a wavelength of about 355 nm, 349 nm, 266 nm, or 262 nm.

19. The method of claim 1 in which the Gaussian beam has an energy and the target beam has an apertured shaped energy that is greater than 50% of the energy of the Gaussian beam.

20. The method of claim 1 in which the aperture has a square shape.

21. A method of changing from an initial value to a nominal value with longterm stability a parameter of a microelectronic circuit component that includes a region of film material supported on a substrate, the region defining a volumetric space that contributes to a determination of the initial value of the parameter, the method comprising:

producing a laser beam having an energy density spatial profile of generally Gaussian shape;

converting the laser beam having a Gaussian energy density spatial profile into a target beam that forms a target spot with a substantially uniform energy density spatial profile; and directing the target beam onto the region of film material to ablate a quantity of the film material to change its initial value to the nominal value, the substantially uniform energy density spatial profile of the target spot having an effective energy density value that minimizes in the substrate or the film material formations of microcracks of sizes and depths that cause spurious break line formations in the substrate.

22. The method of claim 21 in which the substrate includes a ceramic material and the film material includes a thick film resistor material.

23. The method of claim 22 in which the thick film resistor material includes ruthenium oxide.

24. The method of claim 21 in which the substrate includes a ceramic material and the film material includes a thin film resistor material.

25. The method of claim 24 in which the thin film resistor material includes a nickel chromium compound or a tantalum nitride compound.

26. The method of claim 21 in which the region of film material constitutes one of multiple similar regions of film material mutually spaced apart from each other and supported on the substrate, and each of the multiple similar regions of film material has opposite ends positioned between metallic conductors.

27. The method of claim 26 in which the multiple similar regions of film material are separated by precast scribe lines formed in the substrate.

28. The method of claim 26 in which the substrate includes a ceramic material and the film material includes a thick film resistor material.

29. The method of claim 21 in which the region of film material constitutes an element of an array of electrically interconnected elements, and further comprising multiple arrays of electrically interconnected elements, the arrays mutually spaced apart from each other and supported on the substrate.

30. The method of claim 29 in which the arrays of electrically interconnected elements are separated by precast scribe lines formed in the substrate.

31. The method of claim 21 in which the microelectronic component is a resistor, the parameter is resistance, and the substrate includes a ceramic material.

32. The method of claim 21 in which the target spot with the substantially uniform energy density profile has a major axis that is shorter than or equal to 20 µm.

33. The method of claim 21 further comprising:
generating Gaussian beam from a Q-switched, diode-pumped, solid-state laser.

34. The method of claim 21 in which converting the Gaussian beam to the target beam includes passing the beam through an aperture mask for clipping a peripheral portion of the Gaussian beam.

35. The method of claim 34 in which converting the laser beam to a target beam includes passing the laser beam through a beam shaping element, positioned up stream of the aperture mask, for shaping the laser beam.

36. The method of claim 35 in which the beam shaping element comprises a diffractive optical element.

37. The method of claim 36 in which converting the laser beam to a target beam includes passing the beam through a focusing element, positioned up stream of the aperture mask, for shaping the laser beam.

38. The method of claim 21 in which the substantially uniform energy density spatial profile of the target spot has an effective energy density value that minimizes in the substrate or the film material formation of microcracks of sizes and depths that cause parameter value drift from the nominal value.

39. The method of claim 21 in which the microelectronic component comprises a 0402 or 0201 chip resistor.

40. The method of claim 21 in which the substrate is penetrated to a depth of less than 10 μm.

41. The method of claim 40 further comprising:
forming a kerf having a uniformly exposed substrate at the bottom of the kerf.

42. The method of claim 21 in which the substrate is penetrated to a depth of at least 0.1 μm.

43. The method of claim 21 in which the substrate is penetrated to a depth of less than 5 μm.

44. The method of claim 21 in which converting the laser beam to a target beam includes passing the laser beam through a beam shaping element.

45. The method of claim 21 in which laser beam comprises a UV wavelength.

46. The method of claim 35 in which the laser beam comprises an IR wavelength.

47. The method of claim 46 in which target spot comprises a wavelength of about 1.32 and the substrate comprises silicon.

48. The method of claim 21 in which only a top quantity of the volumetric space of the film material is ablated such that the substrate remains unexposed.

49. The method of claim 35 in which the laser beam comprises visible wavelength.

50. The method of claim 21 in which the microelectronic component comprises a capacitor or an inductor.

* * * * *

UNITED STATES PATENT AND TRADEMARK OFFICE
CERTIFICATE OF CORRECTION

PATENT NO. : 6,534,743 B2
DATED : March 18, 2003
INVENTOR(S) : Edward J. Swenson, Yunglong Sun and Richard S. Harris Page 1 of 1

It is certified that error appears in the above-identified patent and that said Letters Patent is hereby corrected as shown below:

Column 2,
Line 10, "type or laser" should read -- type of laser --.

Column 4,
Line 27, "a Guassian beam" should read -- a Gaussian beam --.

Column 5,
Line 31, "coating other" should read -- coating or other --.
Line 58, "**96a-*96c* " should read -- 96a-96c** --.

Column 8,
Line 49, "function work" should read -- function of work --.

Column 10,
Line 19, "numerous microcracks substantial microcracks." should read -- numerous substantial microcracks --.

Column 11,
Line 63, "with longterm stability" should read -- with long-term stability --.

Signed and Sealed this

Fourth Day of November, 2003

JAMES E. ROGAN
*Director of the United States Patent and Trademark Office*